(12) United States Patent
Ru et al.

(10) Patent No.: US 10,732,262 B2
(45) Date of Patent: Aug. 4, 2020

(54) APPARATUS AND METHOD FOR DETECTING ALIGNMENT OF SENSOR IN AN AUTOMOTIVE DETECTION SYSTEM

(71) Applicant: Veoneer US, Inc., Southfield, MI (US)

(72) Inventors: Jifeng Ru, Ogden, UT (US); Cuichun Xu, Ogden, UT (US)

(73) Assignee: Veoneer US, Inc., Southfield, MI (US)

( * ) Notice: Subject to any disclaimer, the term of this patent is extended or adjusted under 35 U.S.C. 154(b) by 200 days.

(21) Appl. No.: 15/845,286

(22) Filed: Dec. 18, 2017

(65) Prior Publication Data
US 2019/0187250 A1   Jun. 20, 2019

(51) Int. Cl.
*G01S 7/40* (2006.01)
*G01S 17/87* (2020.01)
(Continued)

(52) U.S. Cl.
CPC .......... *G01S 7/4052* (2013.01); *G01S 7/4008* (2013.01); *G01S 7/4021* (2013.01); *G01S 7/4026* (2013.01); *G01S 17/87* (2013.01); *G01S 17/931* (2020.01); *G01S 2007/403* (2013.01); *G01S 2007/4034* (2013.01); *G01S 2007/4082* (2013.01); *G01S 2013/9315* (2020.01); *G01S 2013/9323* (2020.01); *G01S 2013/93271* (2020.01);
(Continued)

(58) Field of Classification Search
CPC ............. G01S 13/931; G01S 2007/403; G01S 13/867; G01S 13/865; G01S 2013/9375; G01S 7/4052; G01S 7/4008; G01S 2007/4082; G01S 2013/9378; G01S 7/40; G01S 7/4026; G01S 13/87; G01S 13/872; G01S 13/878; G01S 13/60; G01S 2013/93274; G01S 2013/93271; G01S 2013/93272
USPC .............................. 342/81; 702/151; 33/533
See application file for complete search history.

(56) References Cited

U.S. PATENT DOCUMENTS 6,202,027 B1   3/2001  Alland et al.
7,304,602 B2  12/2007  Shinagawa et al.
(Continued)

FOREIGN PATENT DOCUMENTS

DE  102011015935 A1 * 10/2012  ........... G01S 7/4056
WO  2016/198563       12/2016

*Primary Examiner* — Vladimir Magloire
*Assistant Examiner* — Michael W Justice
(74) *Attorney, Agent, or Firm* — Burns & Levinson LLP; Steven M. Mills

(57) ABSTRACT

An automotive detection system includes a first sensor which transmits first transmitted signals into a region and receives first reflected signals and generates first receive signals. A second sensor transmits second transmitted signals into the region and receives second reflected signals and generates second receive signals. A processor: receives first portions of the first and second receive signals and processes the first portions to generate a relative misalignment angle related to misalignment of the first and second sensors relative to each other; receives a second portion of the first receive signals; uses the received second portion of the first receive signals to determining an absolute misalignment angle of the first sensor independent of an absolute misalignment angle of the second sensor; and uses the relative misalignment angle and the absolute misalignment angle of the first sensor to generate the absolute misalignment angle of the second sensor.

28 Claims, 8 Drawing Sheets

(51) Int. Cl.
*G01S 17/931* (2020.01)
*G01S 13/931* (2020.01)

(52) U.S. Cl.
CPC .............. *G01S 2013/93272* (2020.01); *G01S 2013/93274* (2020.01)

(56) References Cited

U.S. PATENT DOCUMENTS

| | | | |
|---|---|---|---|
| 9,500,742 B2 | 11/2016 | Poiger et al. | |
| 2011/0153268 A1* | 6/2011 | Jordan | G01S 13/931 702/151 |
| 2016/0187466 A1* | 6/2016 | Kim | G01S 7/4026 342/59 |
| 2017/0261600 A1* | 9/2017 | Maennicke | G01S 13/931 |

* cited by examiner

APPARATUS AND METHOD FOR DETECTING ALIGNMENT OF SENSOR IN AN AUTOMOTIVE DETECTION SYSTEM

BACKGROUND

1. Technical Field

The present disclosure is related to automotive detection systems, e.g., radar, LiDAR systems, and, in particular, to an apparatus and method for detecting and correcting for misalignment of a sensor in an automotive detection system.

2. Discussion of Related Art

In automotive detections systems, such as radar systems or LiDAR systems, the sensor, i.e., radar sensor or LiDAR sensor, can be mounted, i.e., physically attached, to the vehicle body or frame. Detection system performance is typically characterized by detection of reflections from objects in proximity to the vehicle to enable implementation of speed control and/or collision preventions. In such automotive detection systems, it is typically desirable to determine an azimuth angle in the form of a target object bearing angle, the range or distance with respect to the objects, and a Doppler relative velocity between the vehicle and these objects.

For typical vehicle detection applications, it is important to measure the target bearing angle with very high precision. The angle accuracy of a detection system depends on fundamental parameters such as modulation technique, antenna design, component tolerances, assembly precision and/or installation conditions. Furthermore, due to various environmental influences such as mechanical stress or bad weather, the angle estimation performance might be degraded. Some of these error sources exhibit a random statistical distribution, while others result in a fixed-angle offset of the sensor module. Monitoring and correcting for misalignment angle can be important in vehicle detection applications.

SUMMARY

According to one aspect, an automotive detection system with monitoring of misalignment of a sensor of the system is provided. The system includes a first sensor having a first signal transmitter for transmitting first transmitted signals into a region and a first receiver for receiving first reflected signals generated by reflection of the first transmitted signals and generating first receive signals indicative of the first reflected signals. A first portion of the first receive signals is generated by reflection of at least a portion of the first transmitted signals from an object in the region. The system further includes a second sensor having a second signal transmitter for transmitting second transmitted signals into the region and a second receiver for receiving second reflected signals generated by reflection of the second transmitted signals and generating second receive signals indicative of the second reflected signals. A first portion of the second receive signals is generated by reflection of at least a portion of the second transmitted signals from the same object in the region. A processor is coupled to the first and second sensors for: (i) receiving the first portion of the first receive signals and the first portion of the second receive signals, (ii) processing the first portion of the first receive signals and the first portion of the second receive signals to generate a relative misalignment angle related to misalignment of the first and second sensors relative to each other, (iii) receiving a second portion of the first receive signals, (iv) using the received second portion of the first receive signals, determining an absolute misalignment angle of the first sensor independent of an absolute misalignment angle of the second sensor, and (v) using the relative misalignment angle and the absolute misalignment angle of the first sensor, generating the absolute misalignment angle of the second sensor.

The first portion of the first receive signals and the first portion of the second receive signals can be generated from received first reflected signals and received second reflected signals, respectively, which are reflected from the object while the object is moving with respect to the first and second sensors. The second portion of the first receive signals can be generated from received first reflected signals, which are reflected from the object while the object is stationary with respect to the first and second sensors. The processor can use the first portion of the first receive signals to generate a first velocity vector for the object, and the processor can use the first portion of the second receive signals to generate a second velocity vector for the object. The processor can further determine a difference between the first and second velocity vectors to generate the relative misalignment angle. The processor can process at least one cluster of radar detections associated with the object in each of the first and second receive signals. The processor can identify one or more associations between detections related to the object in the first and second receive signals.

A first field of view of the first sensor and a second field of view of the second sensor can at least partially overlap in a region of overlap, the object being disposed in the region of overlap. Each of the absolute misalignment angle of the first radar sensor and the absolute misalignment angle of the second radar sensor can be an angle between a prescribed sensor orientation and an actual sensor orientation.

The first and second sensors can be located at a front of a vehicle in which the system is installed. The first and second sensors can be located at a rear of a vehicle in which the system is installed. One of the first and second sensors can be located at a front of a vehicle in which the system is installed, and the other of the first and second sensors can be located at a rear of the vehicle in which the system is installed.

In some exemplary embodiments, if at least one of the absolute misalignment angle of the first radar sensor and the absolute misalignment angle of the second radar sensor exceeds a threshold angle, then an alert is issued. In response to the alert, at least one feature of the radar system is disabled. The disabled feature can include one or more of a blind spot detection feature, a rear cross traffic detection feature, a lane change assistance feature, a trailer detection feature, a safe door opening feature, an adaptive cruise control feature, and/or an autonomous emergency braking feature. In some embodiments, the alert indicates that at least one of the first and second radar sensors is rotated with respect to a prescribed orientation.

The automotive detection system can be a radar system, and the first and second sensors can be radar sensors. Alternatively, the automotive detection system can be a LiDAR system, and the first and second sensors can be LiDAR sensors.

According to another aspect, a method for monitoring alignment of a sensor in an automotive detection system is provided. According to the method, in a first sensor, first transmitted signals are transmitted into a region, first reflected signals generated by reflection of the first transmitted signals are received, and first receive signals indicative of the first reflected signals are generated. A first portion of the first receive signals is generated by reflection of at least a portion of the first transmitted signals from an object in the region. In a second sensor, second transmitted signals are transmitted into the region, second reflected signals generated by reflection of the second transmitted signals are received, and second receive signals indicative of the second reflected signals are generated. A first portion of the second receive signals are generated by reflection of at least a portion of the second transmitted signals from the same object in the region. In a processor coupled to the first and second sensors, (i) the first portion of the first receive signals and the first portion of the second receive signals are received, (ii) the first portion of the first receive signals and the first portion of the second receive signals are processed to generate a relative misalignment angle related to misalignment of the first and second sensors relative to each other, (iii) a second portion of the first receive signals is received, (iv) an absolute misalignment angle of the first sensor independent of an absolute misalignment angle of the second sensor is determined using the received second portion of the first receive signals, and (v) the absolute misalignment angle of the second sensor is generated using the relative misalignment angle and the absolute misalignment angle of the first sensor.

The first portion of the first receive signals and the first portion of the second receive signals can be generated from received first reflected signals and received second reflected signals, respectively, which are reflected from the object while the object is moving with respect to the first and second sensors. The second portion of the first receive signals can be generated from received first reflected signals, which are reflected from the object while the object is stationary with respect to the first and second sensors. The processor can use the first portion of the first receive signals to generate a first velocity vector for the object, and the processor can use the first portion of the second receive signals to generate a second velocity vector for the object. The processor can further determine a difference between the first and second velocity vectors to generate the relative misalignment angle. The processor can process at least one cluster of radar detections associated with the object in each of the first and second receive signals. The processor can identify one or more associations between detections related to the object in the first and second receive signals.

A first field of view of the first sensor and a second field of view of the second sensor can at least partially overlap in a region of overlap, the object being disposed in the region of overlap. Each of the absolute misalignment angle of the first radar sensor and the absolute misalignment angle of the second radar sensor can be an angle between a prescribed sensor orientation and an actual sensor orientation.

The first and second sensors can be located at a front of a vehicle in which the system is installed. The first and second sensors can be located at a rear of a vehicle in which the system is installed. One of the first and second sensors can be located at a front of a vehicle in which the system is installed, and the other of the first and second sensors can be located at a rear of the vehicle in which the system is installed.

In some exemplary embodiments, if at least one of the absolute misalignment angle of the first radar sensor and the absolute misalignment angle of the second radar sensor exceeds a threshold angle, then an alert is issued. In response to the alert, at least one feature of the radar system is disabled. The disabled feature can include one or more of a blind spot detection feature, a rear cross traffic detection feature, a lane change assistance feature, a trailer detection feature, a safe door opening feature, an adaptive cruise control feature, and/or an autonomous emergency braking feature. In some embodiments, the alert indicates that at least one of the first and second radar sensors is rotated with respect to a prescribed orientation.

The automotive detection system can be a radar system, and the first and second sensors can be radar sensors. Alternatively, the automotive detection system can be a LiDAR system, and the first and second sensors can be LiDAR sensors.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

Figure 1:
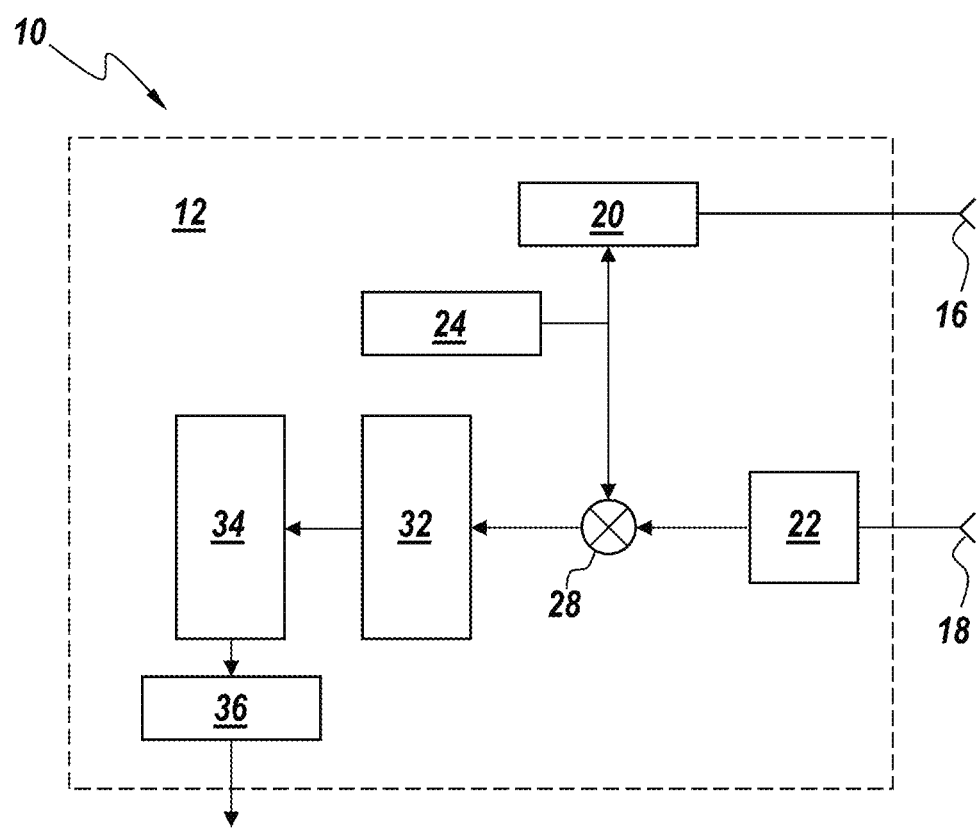
FIG. 1 includes a schematic block diagram of an automotive detection system, such as an automotive radar system.

FIG. 1 includes a schematic block diagram of an automotive detection system 10, such as an automotive radar system or automotive LiDAR system. It is noted that, although the following detailed description refers to system 10 as an automotive radar system as an exemplary illustrative embodiment, the present disclosure is directed to automotive detection systems in general and can be, for example, automotive radar systems, automotive LiDAR systems, or other such detection systems. The description herein of radar system components and signal processing are applicable to analogous components and signal processing of LiDAR systems. System 10 of FIG. 1 includes one or more detection modules such as radar sensor modules 12 for processing automotive radar signals, in accordance with some exemplary embodiments. Referring to FIG. 1, system 10 includes one or more radar modules 12, which process radar transmit and receive signals which are compatible with the radar detection and monitoring system 10 in the host automobile. Radar module 12 generates and transmits radar signals into the region adjacent to the host vehicle that is being monitored by system 10. Generation and transmission of signals is accomplished by RF signal generator 24, radar transmit circuitry 20 and transmit antenna 16. Radar transmit circuitry 20 generally includes any circuitry required to generate the signals transmitted via transmit antenna 16, such as pulse shaping/timing circuitry, transmit trigger circuitry, RF switch circuitry, or any other appropriate transmit circuitry used by radar system 10.

Radar module 12 also receives returning radar signals at radar receive circuitry 22 via receive antenna 18. Radar receive circuitry 22 generally includes any circuitry required to process the signals received via receive antenna 18, such as pulse shaping/timing circuitry, receive trigger circuitry, RF switch circuitry, or any other appropriate receive circuitry used by the radar system. The received radar signals are processed by radar receive circuitry 22 to generate processed receive signals, which are forwarded to a mixer 28, which mixes the processed receive signals with an RF signal from RF signal generator 24. The resulting difference signals may be further filtered as required by filtering circuitry 32 to generate baseband signals, which are digitized by analog-to-digital converter circuitry (ADC) 34 to generate receive signals. In automotive radar systems, these digitized baseband receive signals are processed by a processor, such as a digital signal processor (DSP) 36, to generate target object detections related to objects in the region being monitored by detection system 10. In some exemplary embodiments, the DSP 36 can perform any and/or all of the processing tasks required to implement the sensor alignment monitoring, compensation and/or correction described herein according to the exemplary embodiments.

Figure 2:
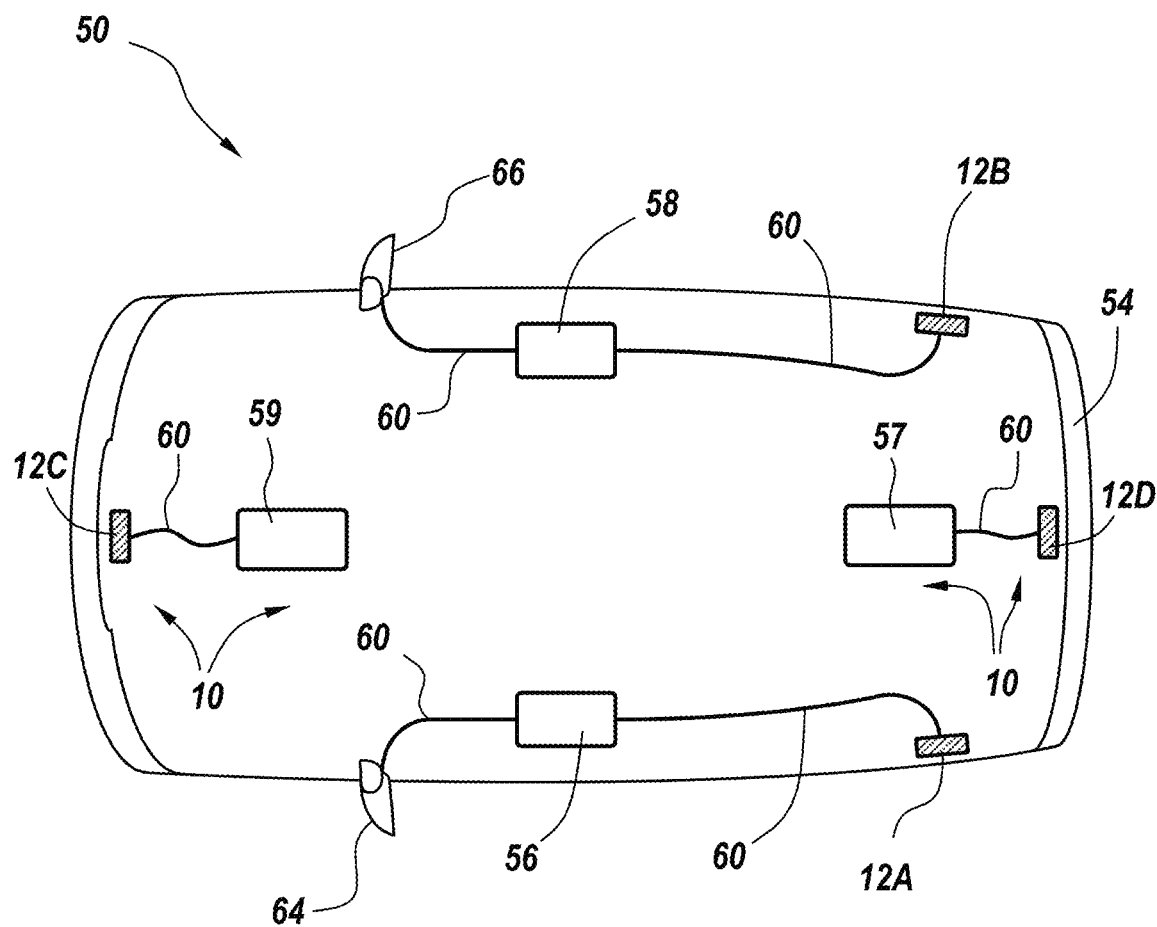
FIG. 2 includes a schematic top view of an automobile or vehicle equipped with the automotive detection system of FIG. 1, which includes one or more radar sensor modules.

FIG. 2 includes a schematic top view of an automobile or vehicle 50 equipped with detection system 10, which includes one or more radar sensor modules 12. A first radar sensor module 12A can be connected via a bus 60, which in some exemplary embodiments is a standard automotive controller area network (CAN) bus, to a first CAN bus electronic control unit (ECU) 56. Object detections from radar sensor module 12A can be reported to ECU 56, which processes the detections and can provide detection alerts via CAN bus 60. In some exemplary embodiments, the alerts can be in the form of a visible indicator, such as a light-emitting diode (LED) in side mirror 64, which is visible to the driver. Similarly, in some exemplary embodiments, a second radar sensor module 12B can be connected via CAN bus 60, to a second CAN bus electronic control unit (ECU) 58. Object detections from radar sensor module 12B can be reported to ECU 58, which processes the detections and can provide detection alerts via CAN bus 60 to a visible indicator, such as a light-emitting diode (LED) in side mirror 66. In the particular embodiment illustrated in FIG. 2, first and second radar sensor modules 12A and 12B of radar system 10 are part of a blind spot system for reporting object detections in one or both blind spots of automobile 50. It will be understood that the present disclosure is applicable to other types of radar systems 10. For example, in some exemplary embodiments, one or more forward-looking radar sensor modules 12C can be connected via CAN bus 60 to a third CAN bus electronic control unit (ECU) 59, and one or more rear-looking radar sensor modules 12D can be connected via CAN bus 60 to a fourth CAN bus electronic control unit (ECU) 57. ECUs 57 and 59 can process target object detections from radar sensor modules 12C and 12D, respectively, and can provide detection alerts to a visible indicator or to a vehicle system process for appropriate processing and management of detections.

It will be understood that, according to the present disclosure, detection system 10 can have many configurations, each including different numbers and locations of sensor modules 12. For example, detection system 10 can include one or more forward-looking sensor modules 12, one or more rear-looking sensor modules 12, and/or one or more side-looking sensor modules 12. Data gathered by sensor modules 12 can be processed by one or more processors, e.g., ECUs(s), to carry out the various features implemented by detection system 10. These features can include, but are not limited to, at least one or any combination of any subset of: a blind spot detection feature, a rear cross traffic detection feature, a lane change assistance feature, a trailer detection feature, a safe door opening feature an adaptive cruise control feature, and an autonomous braking feature.

Figure 3:
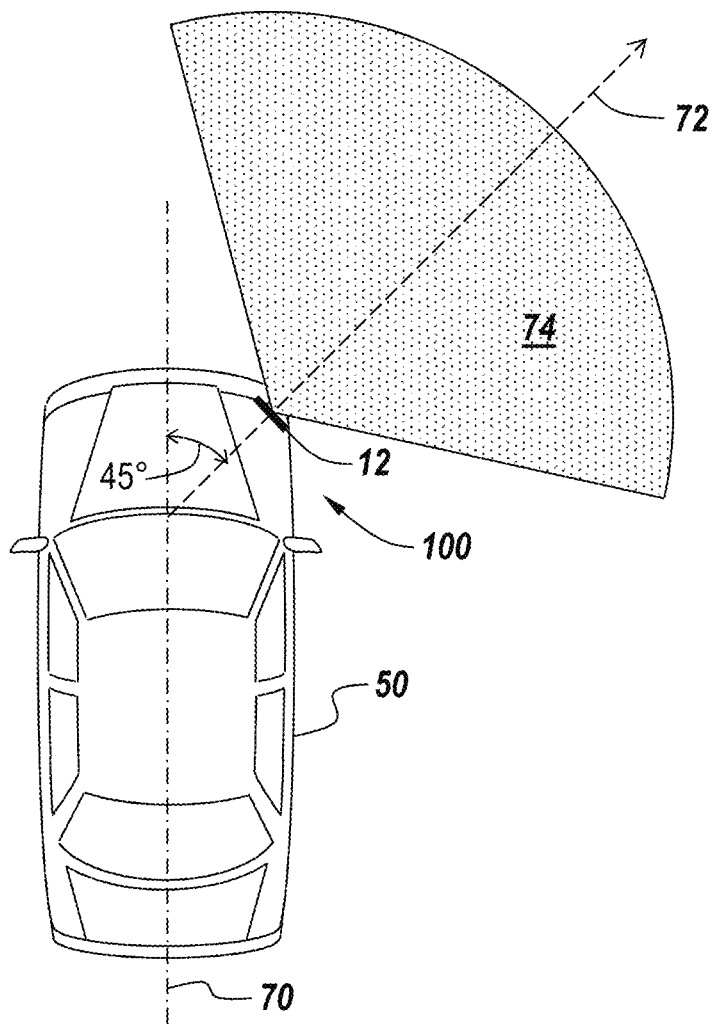
FIG. 3 includes a schematic top view of an automobile or vehicle equipped with the automotive detection system of FIG. 1, including an exemplary front corner radar sensor module.

In general, sensor modules in automotive detection systems such as detection system 10 described herein in detail are mounted at specified positions and point at a specified angle with respect to the host vehicle. FIG. 3 includes a schematic top view of an automobile or vehicle 50 equipped with detection system 10, including an exemplary front corner radar sensor module 12. Referring to FIG. 3, front, right corner radar sensor module 12 can be mounted inside the front bumper at the front right corner of vehicle 50. As illustrated in the exemplary configuration of FIG. 3, sensor module 12 can be mounted to point into a region 74 along a pointing direction 72, which forms an angle of, for example, 45°, with respect to a center line 70 of vehicle 50.

In automotive detection systems such as detection system 10, sensor module alignment is important to proper operation. The system and each sensor module should have verification of alignment of each sensor module in the system. To that end, according to the present disclosure, a fast, efficient and accurate means for determining and correcting for sensor module misalignment is provided.

Figure 4:
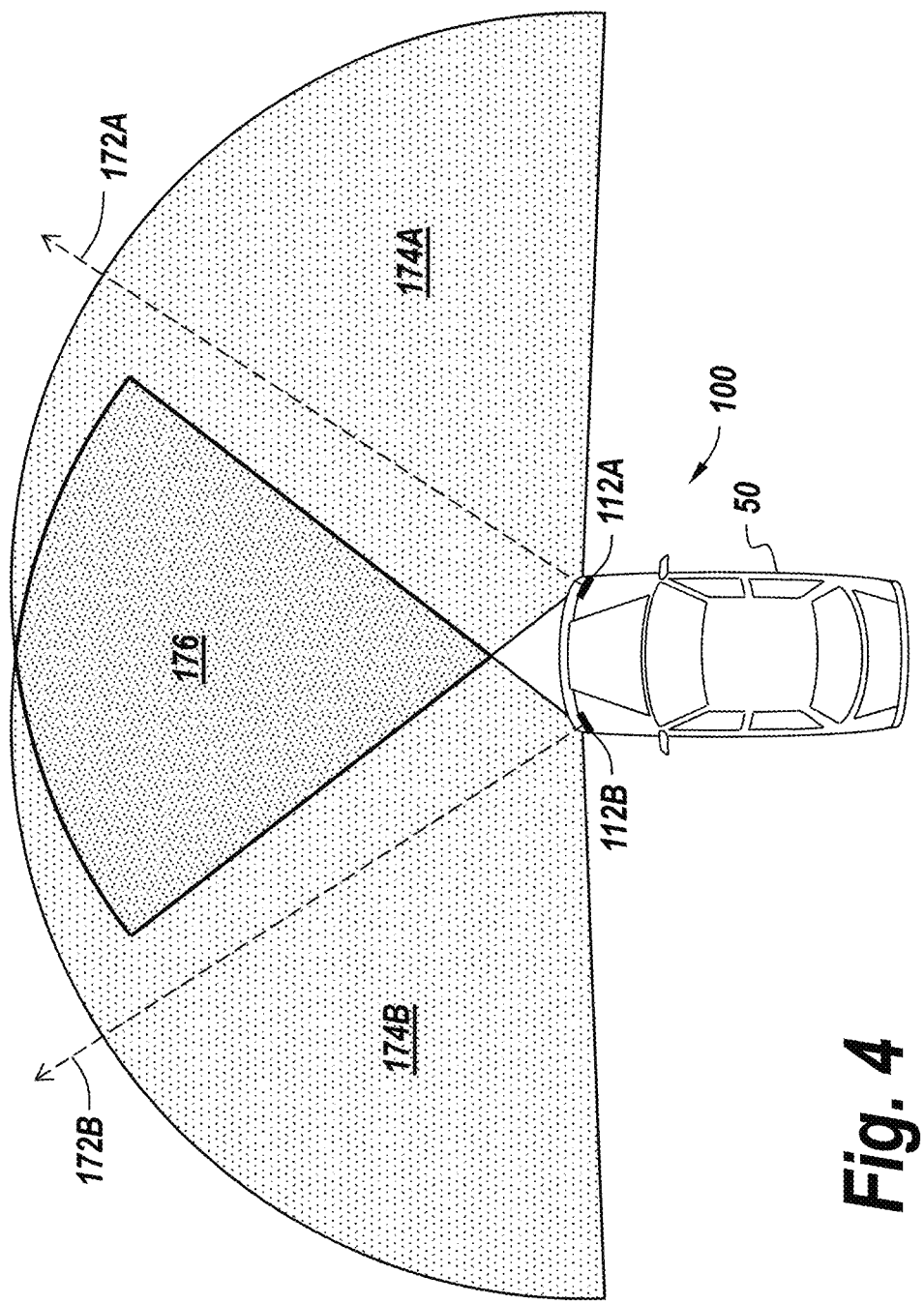
FIG. 4 includes a portion of an automobile or vehicle equipped with the automotive detection system of FIG. 1, which includes at least two front corner radar sensor modules.

FIG. 4 includes a portion of an automobile or vehicle 50, equipped with a detection system 100, which includes at least two sensor modules 112A, 112B, according to some exemplary embodiments. Referring to FIG. 4, right front sensor module 112A can be mounted to point into a region 174A along a pointing direction 172A, and left front sensor module 112B can be mounted to point into a region 174B along a pointing direction 172B. Regions 174A and 174B overlap in an overlap region 176, which is in the field of view (FOV) of both sensor modules 112A and 112B.

Each sensor module is characterized by an alignment bias, which is an angle defining the extent of the detected misalignment of the sensor module. In multiple-sensor detection systems such as system 100 illustrated in FIG. 4, the relative radar alignment bias is the difference between the absolute or individual alignment biases of the multiple sensor modules 112A, 112B. Referring to FIG. 4, the alignment bias of sensor module 112A is defined as $\Delta \Theta_1$, and the alignment bias of sensor module 112B is defined as $\Delta \Theta_2$. The relative radar alignment bias is defined as $\Delta \Theta r = \Delta \Theta_1 - \Delta \Theta_2$. For example, if sensor module 112A has a 0.4° alignment bias, and sensor module 112B has a 1.6° alignment bias, the relative alignment bias is $\Delta \Theta r = 0.4 - 1.6 = -1.2°$.

Figure 5:
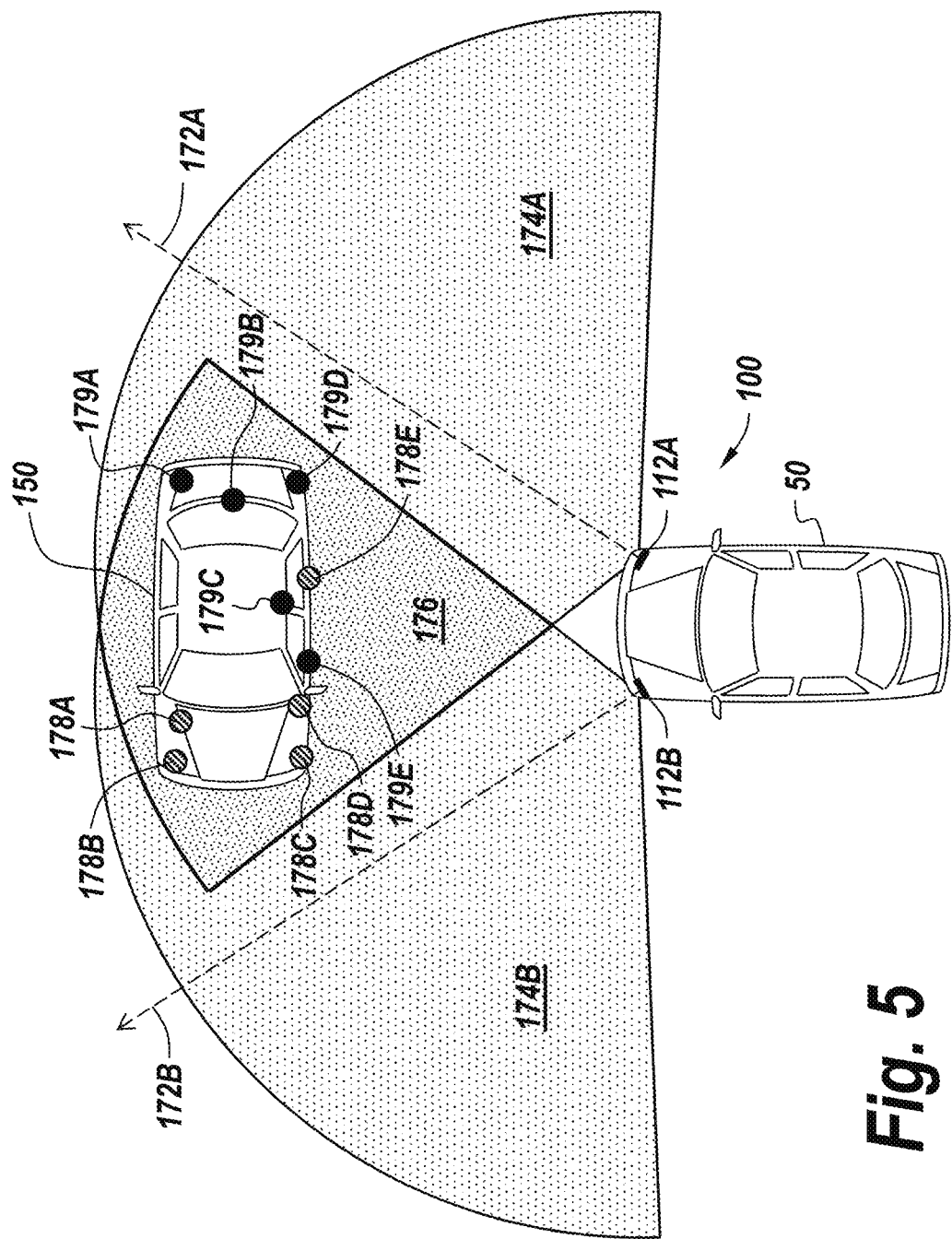
FIG. 5 includes a schematic diagram similar to FIG. 4, with the addition of a target object, for example, a target vehicle, in an overlap region defined by the fields of view of the two front corner radar sensor modules.

According to exemplary embodiments described herein, relative alignment bias between a plurality of sensor modules, e.g., sensor modules 112A and 112B, can be detected utilizing a target object in the common detection region or common field of view (FOV) or overlap region 176. FIG. 5 includes a schematic diagram similar to FIG. 4, with the addition of a target object, for example, a vehicle 150, in the overlap region 176. As illustrated in FIG. 5, target vehicle 150 appears in the FOV of both sensor modules 112A and 112B. In some exemplary embodiments, each sensor module 112A, 112B detects a plurality of points on target vehicle 150. That is, each sensor module 112A, 112B processes multiple detections due to reflections from target vehicle 150. For example, sensor module 112A detects points 179A, 179B, 179C, 179D, and 179E; and sensor module 112B detects points 178A, 178B, 178C, 178D, and 178E. According to some exemplary embodiments, each sensor module 112A and 112B performs detection processing, which may include well-known point cluster algorithm processing, on its respective set of points, to determine or estimate a velocity vector for target vehicle 150. If the two velocity vectors computed by sensor modules 112A, 112B are inconsistent, then it can be concluded that there exists a relative alignment bias between sensor modules 112A, 112B. In some exemplary embodiments, this approach is applicable whether target vehicle is stationary or moving relatively in a straight line, and whether host vehicle 50 is stationary or moving in a straight line. In any case, in some exemplary embodiments, it can be assumed that there is no relative turning motion between host vehicle 50 and target vehicle 150.

In many radar systems, such as system 100 of the exemplary embodiments, a detection is characterized by a three-dimensional vector composed of range, Doppler, and angle (r, d, Θ). In multiple sensor systems, the radar angle detections are usually converted to a common reference direction (CRD). For example, referring to FIGS. 3-5, the CRD may be the pointing angle of sensor module 112A, sensor module 112B, or the direction of the center line 70 of host vehicle 50. Detections from sensor module 112A can be denoted as $(r_1^{(1)}, d_1^{(1)}, \Theta_1^{(1)})$, $(r_2^{(1)}, d_2^{(1)}, \Theta_2^{(1)})$, ..., $(r_{N1}^{(1)}, d_{N1}^{(1)}, \Theta_{N1}^{(1)})$, where N1 is the number of detections from sensor module 112A; and $r_i^{(1)}$, $d_i^{(1)}$, $\Theta_i^{(1)}$ the $i^{th}$ range detection, Doppler detection, and angle detection in the CRD, respectively, from sensor module 112A. Similarly, detections from sensor module 112B can be denoted as $(r_1^{(2)}, d_1^{(2)}, \Theta_1^{(2)})$, $(r_2^{(2)}, d_2^{(2)}, \Theta_2^{(2)})$, ..., $(r_{N2}^{(2)}, d_{N2}^{(2)}, \Theta_{N2}^{(2)})$, where N2 is the number of detections from sensor module 112B; and $r_i^{(2)}$, $d_i^{(2)}$, $\Theta_i^{(2)}$ are the $i^{th}$ range detection, Doppler detection, and angle detection in the CRD, respectively, from sensor module 112B.

Figure 6:
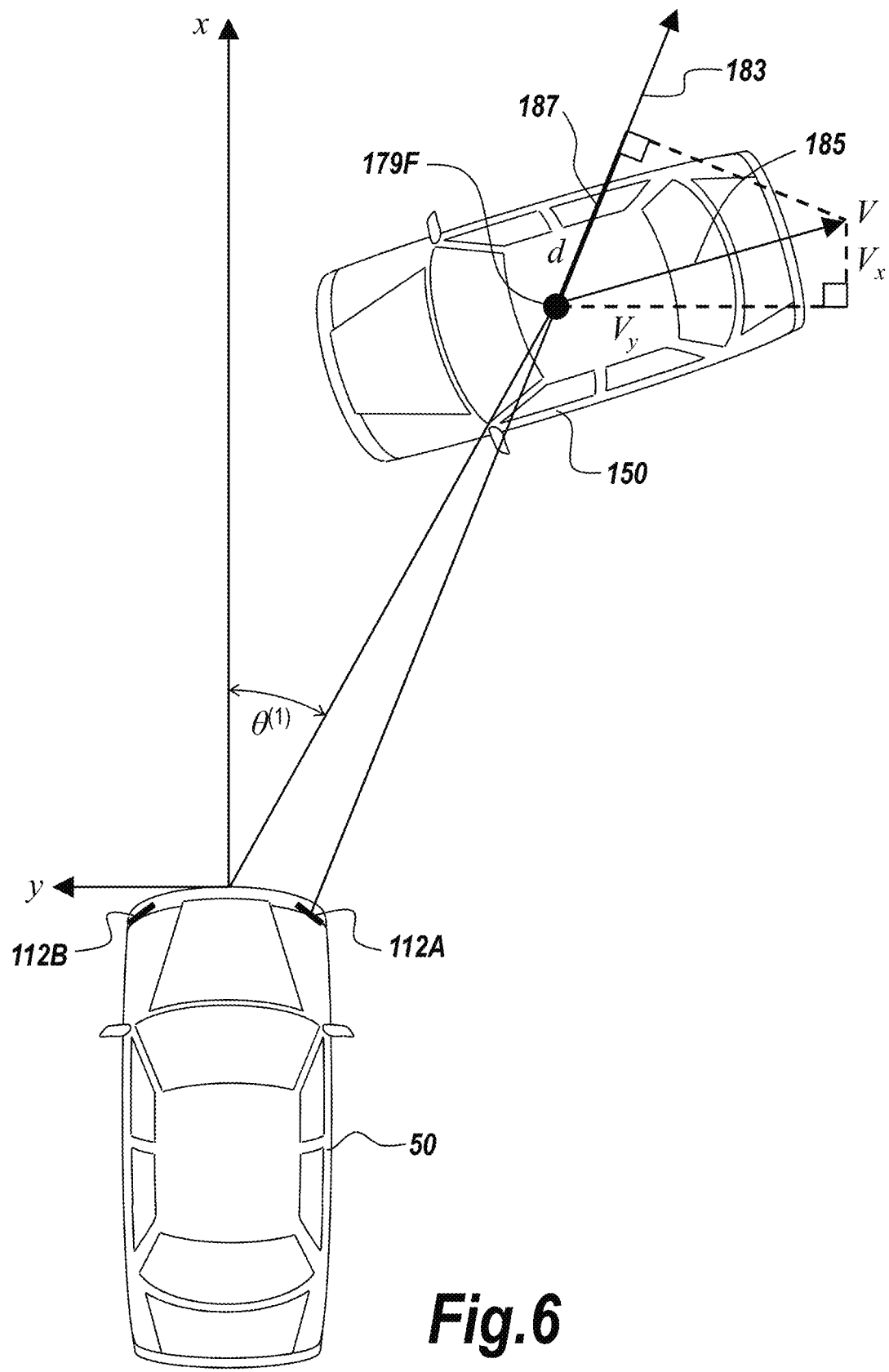
FIG. 6 includes a schematic diagram similar to FIGS. 4 and 5, illustrating a detection of the target vehicle.

FIG. 6 includes a schematic diagram similar to FIGS. 4 and 5, illustrating a detection of target vehicle 150. Referring to FIG. 6, solid arrow x points along the common reference direction (CRD) used for this illustration; and solid arrow y points along the direction perpendicular to the CRD. Dot 179F indicates an exemplary detection on vehicle 150 by sensor module 112A. Solid arrow 183 indicates the line of sight from sensor module 112A to detection point 179F. Arrow 185 labeled V indicates the target velocity vector with respect to the CRD. The dashed line labeled $V_y$ represents they velocity component of target velocity vector V with respect to the CRD, and the dashed line labeled $V_x$ represents the x velocity component of target velocity vector V with respect to the CRD.

Referring to FIG. 6, if there is no alignment bias, the relationship among detections can be given by:

$$[\cos(\theta) \quad \sin(\theta)] \begin{bmatrix} v_x \\ v_y \end{bmatrix} = [d]; \quad (1)$$

where Θ is the angle with respect to the CRD for any detection, d is the Doppler for that detection, $v_x$ and $v_y$ are the x component and y components, respectively, of the target velocity vector with respect to the CRD. This relationship holds true for detections by any of the sensor modules, e.g., sensor module 112A and/or sensor module 112B.

However, if there are alignment biases, the relationship (1) above becomes:

$$[\cos(\theta^{(1)}) \quad \sin(\theta^{(1)})] \begin{bmatrix} v_x^{(1)} \\ v_y^{(1)} \end{bmatrix} = [d^{(1)}]; \quad (2)$$

where $\Theta^{(1)}$ is the angle of a detection from sensor module 112A, $d^{(1)}$ is the Doppler of that detection, and $(v_x^{(1)}, v_y^{(1)})$ are the rotated velocity vector, rotated by the alignment bias of sensor module 112A, i.e., $$\begin{bmatrix} v_x^{(1)} \\ v_y^{(1)} \end{bmatrix} = \begin{bmatrix} \cos(\Delta\theta_1) & -\sin(\Delta\theta_1) \\ \sin(\Delta\theta_1) & \cos(\Delta\theta_1) \end{bmatrix} \begin{bmatrix} v_x \\ v_y \end{bmatrix}. \quad (3)$$

Similarly, for detections by sensor module 112B, the relationship becomes:

$$[\cos(\theta^{(2)}) \quad \sin(\theta^{(2)})] \begin{bmatrix} v_x^{(2)} \\ v_y^{(2)} \end{bmatrix} = [d^{(2)}]; \quad (4)$$

where $\Theta^{(2)}$ is the angle of a detection from sensor module 112B, $d^{(2)}$ is the Doppler of that detection, and $(v_x^{(2)}, v_y^{(2)})$ are the rotated velocity vector, rotated by the alignment bias of sensor module 112A, i.e., $$\begin{bmatrix} v_x^{(2)} \\ v_y^{(2)} \end{bmatrix} = \begin{bmatrix} \cos(\Delta\theta_2) & -\sin(\Delta\theta_2) \\ \sin(\Delta\theta_2) & \cos(\Delta\theta_2) \end{bmatrix} \begin{bmatrix} v_x \\ v_y \end{bmatrix}. \quad (5)$$

Therefore, if vectors $$\begin{bmatrix} v_x^{(1)} \\ v_y^{(1)} \end{bmatrix} \text{ and } \begin{bmatrix} v_x^{(2)} \\ v_y^{(2)} \end{bmatrix}$$

are estimated according to the exemplary embodiments, the angle between the two vectors will be the relative alignment bias $\Delta \Theta r$.

According to the exemplary embodiments, the overdetermined equation set $$\begin{bmatrix} \cos(\theta_1^{(1)}) & \sin(\theta_1^{(1)}) \\ \cos(\theta_2^{(1)}) & \sin(\theta_2^{(1)}) \\ \vdots & \vdots \\ \cos(\theta_{N1}^{(1)}) & \sin(\theta_{N1}^{(1)}) \end{bmatrix} \begin{bmatrix} v_x^{(1)} \\ v_y^{(1)} \end{bmatrix} = \begin{bmatrix} d_1^{(1)} \\ d_2^{(1)} \\ \vdots \\ d_{N1}^{(1)} \end{bmatrix}, \quad (6)$$

which represents a cluster of detections by sensor module 112A, is solved to determine vector $$\begin{bmatrix} v_x^{(1)} \\ v_y^{(1)} \end{bmatrix},$$

which is the estimated relative velocity vector of target vehicle 150 detected by sensor module 112A. This radar detection can contain clutter and outliers. Therefore, an outlier-robust algorithm, such as the well-known Random Sample Consensus (RANSAC) algorithm or Robust Fitting algorithm, can be used to solve the overdetermined equation set (6).

Similarly, the overdetermined equation set $$\begin{bmatrix} \cos(\theta_1^{(2)}) & \sin(\theta_1^{(2)}) \\ \cos(\theta_2^{(2)}) & \sin(\theta_2^{(2)}) \\ \vdots & \vdots \\ \cos(\theta_{N2}^{(2)}) & \sin(\theta_{N2}^{(2)}) \end{bmatrix} \begin{bmatrix} v_x^{(2)} \\ v_y^{(2)} \end{bmatrix} = \begin{bmatrix} d_1^{(2)} \\ d_2^{(2)} \\ \vdots \\ d_{N2}^{(2)} \end{bmatrix}, \quad (7)$$

which represents a cluster of detections by sensor module 112B, is solved to determine vector $$\begin{bmatrix} v_x^{(2)} \\ v_y^{(2)} \end{bmatrix},$$

which is the estimated relative velocity vector of target vehicle 150 detected by sensor module 112B. As described above, an outlier-robust algorithm, such as the well-known RANSAC algorithm or Robust Fitting algorithm, can be used to solve the overdetermined equation set (7).

From the coordinate definition, the relative alignment bias $\Delta \Theta r$ is equal to the angle between the estimated velocity vectors from the two sensor modules 112A, 112B. That is, $$\Delta \theta_r = \operatorname{sign}(v_x^{(1)} * v_y^{(2)} - v_x^{(2)} * v_y^{(1)}) * \quad (8)$$
$$\operatorname{acos}\left( \frac{v_x^{(1)} * v_x^{(2)} + v_y^{(1)} * v_y^{(2)}}{\sqrt{(v_x^{(1)})^2 + (v_y^{(1)})^2} \sqrt{(v_x^{(2)})^2 + (v_y^{(2)})^2}} \right);$$

where sign( ) is the sign operator, and a cos( ) is the arccosine function.

Figure 7:
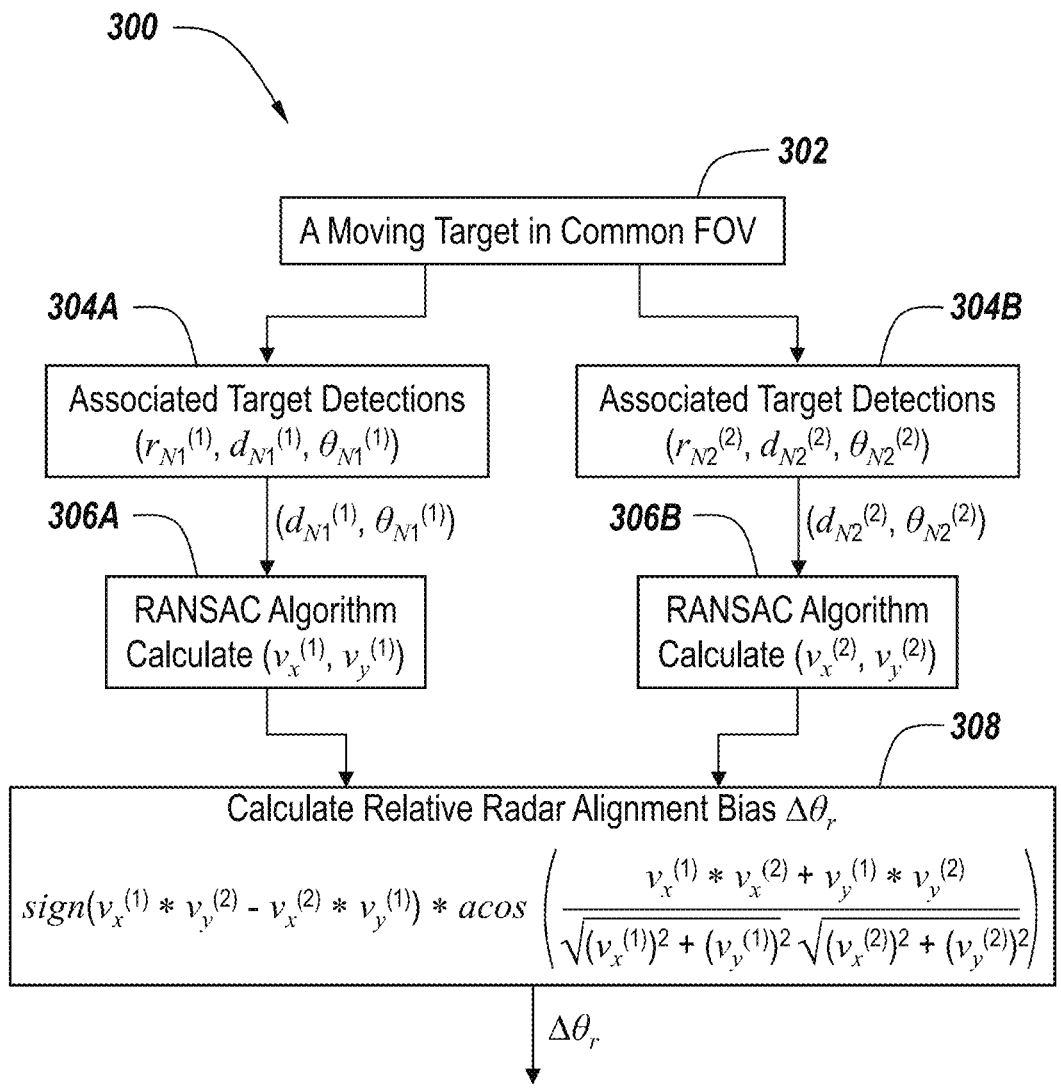
FIG. 7 includes a schematic logical flow diagram of a method of determining sensor module misalignment, according to some exemplary embodiments.

FIG. 7 includes a schematic logical flow diagram of a method 300 of determining sensor module misalignment, according to some exemplary embodiments. Referring to FIGS. 5-7, as described above in detail, in step 302, a target vehicle 150, which can be stationary or moving, is located in common FOV 176. In step 304A, target detections are obtained by one of the sensor modules, e.g., sensor module 112A, and, in step 304B, target detections are obtained by another of the sensor modules, e.g., sensor module 112B. In step 306A, target detections from step 304A are processed under the RANSAC or similar algorithm to determine the target velocity vector generated by sensor module 112A, and, in step 306B, target detections from step 304B are processed under the RANSAC or similar algorithm to determine the target velocity vector generated by sensor module 112B. In step 308, the relative sensor alignment bias between sensor modules 112A and 112B, $\Delta \Theta r$, is calculated according to equation (8) above.

It should be noted that, if the two sensor modules do not have many detections from the target vehicle in a cycle, the multiple detections from a relatively short period, e.g., 0.5 second, in which the target vehicle has constant velocity, can be used. The convergence speed of the traditional individual stationary-target-based alignment algorithm performed by sensor modules 112A and 112B is highly dependent on the environment. In many situations, the alignment algorithm of one of the sensor modules, e.g., sensor module 112B, requires much more time than that of another sensor module, e.g., sensor module 11A, to converge. In this situation, the relative alignment bias is estimated as described above, and the relationship $\Delta \Theta r = \Delta \Theta_1 - \Delta \Theta_2$ can be used to determine the absolute bias of the slower sensor module, i.e., in the case of sensor module 112B, $\Delta \Theta_2 = \Delta \Theta_1 - \Delta \Theta_r$, and, in the case of sensor module 112A, $\Delta \Theta_1 = \Delta \Theta_2 + \Delta \Theta_r$.

Figure 8:
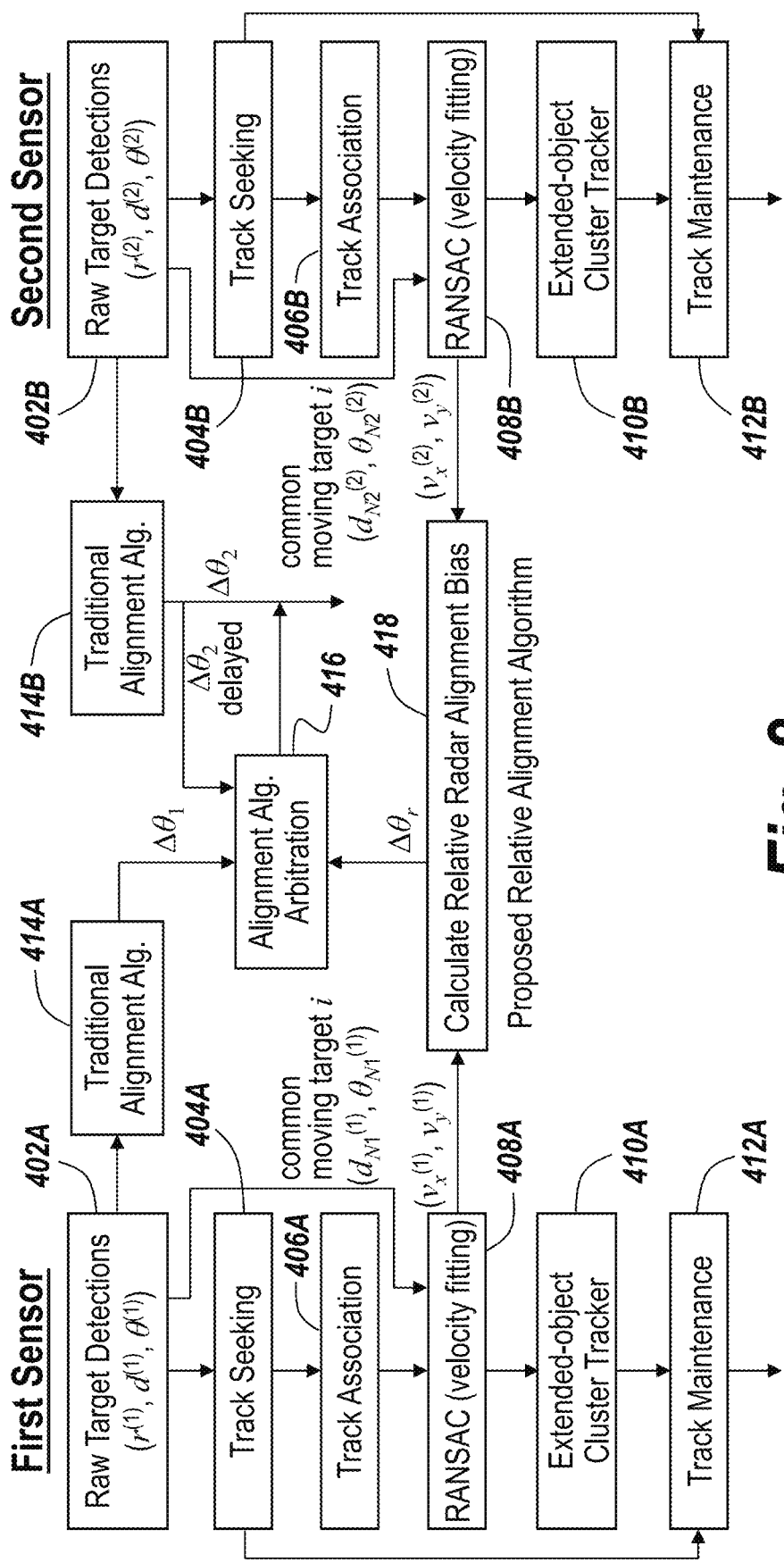
FIG. 8 is a schematic logical flow diagram of detection processing in a detection system, which includes sensor module alignment as described herein in detail.

FIG. 8 is a schematic logical flow diagram of detection processing 400 in a detection system, which includes sensor module alignment as described herein in detail. The logical flow diagram of FIG. 8 illustrates integrating relative sensor module misalignment of the present disclosure into an automotive radar system, together with a traditional stationary-target-based sensor alignment technique. As described above in detail, the convergence speed of the traditional alignment algorithm is highly dependent on the environment. In situations in which the alignment algorithm of one of the sensor modules requires much more time than that of another sensor module, the relative alignment bias can be used to determine the absolute bias of the slower sensor module.

Referring to FIG. 8, in a first sensor module, e.g., sensor module 112A, raw target detections are generated in step 402A. In step 404A, when sufficient detections have been generated to identify a target object, a track for each detected object is initialized. In step 406A, as new detections are received, they are associate with the tracks generated in step 404A. In step 408A, the RANSAC algorithm, or other similar algorithm, is used to perform velocity fitting to provide a coarse estimate of velocity of the identified targets being tracked. In step 410A, extended object cluster tracking is perfumed to filter and smooth target position and velocity obtained in the coarse velocity fitting of step 408A. In step 412A, track maintenance is performed. This includes, among other tasks, terminating or closing tracks when detections for the associated target object are no longer being generated, and/or merging multiple tracks that were initiated for the same target object. In step 414A, sensor module 112A performs its individual stationary-target-based sensor alignment procedure to determine an alignment bias for sensor module 112A. The foregoing steps 402A, 404A, 406A, 408A, 410A, 412A and 414A are also performed by a second sensor module, e.g., sensor module 112B, in analogous steps 402B, 404B, 406B, 408B, 410B, 412B and 414B, respectively, to generate its individual alignment bias.

As noted above, and as illustrated in the alignment algorithm arbitration step 416 in FIG. 8, the convergence speed of the traditional individual stationary-target-based alignment algorithm performed by sensor modules 112A and 112B is highly dependent on the environment. In many situations, the alignment algorithm of one of the sensor modules, e.g., sensor module 112B, requires much more time than that of another sensor module, e.g., sensor module 11A, to converge. That is, generation of $\Delta \Theta_2$ in sensor module 112B can be delayed with respect to generation of $\Delta \Theta_1$ by sensor module 112A. In this situation, the relative alignment bias is estimated as described above, and the relationship $\Delta \Theta r = \Delta \Theta_1 - \Delta \Theta_2$ can be used to determine the absolute bias of the slower sensor module, i.e., in the case of sensor module 112B, $\Delta \Theta_2 = \Delta \Theta_1 - \Delta \Theta_r$, and, in the case of sensor module 112A, $\Delta \Theta_1 = \Delta \Theta_2 + \Delta \Theta_r$. This relative alignment bias, as described above in detail, is illustrated as step 418 in FIG. 8.

According to the present disclosure, sensor module alignment in a detection system such as an automotive radar or LiDAR detection system uses multiple detections of a single target in one detection cycle. Based on detections from just a single cycle, relative alignment bias is determined. Also, in the approach of the present disclosure, host vehicle speed is not required. These capabilities are in contrast to other prior systems, which use multiple moving targets to estimate the individual radar sensor biases. However, since these prior approaches use a single detection from a target in a single cycle, the approaches take a long time to converge. Some prior radar systems typically use multiple stationary targets to estimate the radar biases. However, they need to have accurate host car speed as an input, they do not use detection from a moving target, and they typically take a long time to converge.

As described above, the approach of the disclosure determines an alignment angle of a radar sensor in an automotive radar system. In some embodiments, when misalignment of the radar sensor is larger than some predetermined threshold misalignment angle, such as, for example, 10 degrees of misalignment, then the system can generate an alert. In response to the alert, the user can physically alter the alignment of the sensor, such as by reinstalling the sensor, to correct the misalignment. Alternatively, or in addition, in response to the alert, the radar system can disable one or more of its features. These features can include, but are not limited to, at least one or any combination of any subset of: a blind spot detection feature, a rear cross traffic detection feature, a lane change assistance feature, a trailer detection feature, a safe door opening feature, an adaptive cruise control feature, and an autonomous braking feature.

It is noted that the disclosure describes in detail misalignment of a sensor in an automotive detection system using azimuthal angular misalignment as an illustrative exemplary embodiment. It will be understood by those skilled in the art that the present disclosure is applicable to other misalignments, such as vertical (elevational) angular misalignment and any combination of azimuthal and elevational misalignment.

Throughout the foregoing, the disclosure relates to an approach to detecting and compensating for sensor misalignment in an automotive detection system, such as an automotive radar or LiDAR detection system. It should be noted that the foregoing is also applicable to detection systems other than automotive detection systems.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. An automotive detection system with monitoring of misalignment of a sensor of the system, comprising:
a first sensor having a first signal transmitter for transmitting first transmitted signals into a region and a first receiver for receiving first reflected signals generated by reflection of the first transmitted signals and generating first receive signals indicative of the first reflected signals, a first portion of the first receive signals being generated by reflection of at least a portion of the first transmitted signals from an object in the region;
a second sensor having a second signal transmitter for transmitting second transmitted signals into the region and a second receiver for receiving second reflected signals generated by reflection of the second transmitted signals and generating second receive signals indicative of the second reflected signals, a first portion of the second receive signals being generated by reflection of at least a portion of the second transmitted signals from the same object in the region; and
a processor coupled to the first and second sensors for: (i) receiving the first portion of the first receive signals and the first portion of the second receive signals, (ii) generating a first velocity vector for the object using the first portion of the first receive signals, (iii) generating a second velocity vector for the object using the first portion of the second receive signals, (iv) using the first and second velocity vectors, generating a relative misalignment angle related to misalignment of the first and second sensors relative to each other, (v) receiving a second portion of the first receive signals, (vi) using the received second portion of the first receive signals, determining an absolute misalignment angle of the first sensor independent of an absolute misalignment angle of the second sensor, and (vii) using the relative misalignment angle and the absolute misalignment angle of the first sensor, generating the absolute misalignment angle of the second sensor; wherein the processor is adapted to process at least one cluster of radar detections associated with the object in each of the first and second receive signals in generating the first and second velocity vectors.

2. The automotive detection system of claim 1, wherein the first portion of the first receive signals and the first portion of the second receive signals are generated from received first reflected signals and received second reflected signals, respectively, which are reflected from the object while the object is moving with respect to the first and second sensors.

3. The automotive detection system of claim 1, wherein the second portion of the first receive signals is generated from received first reflected signals, which are reflected from the object while the object is stationary with respect to the first and second sensors.

4. The automotive radar system of claim 1, wherein the processor identifies one or more associations between detections related to the object in the first and second receive signals.

5. The automotive radar system of claim 1, wherein a first field of view of the first sensor and a second field of view of the second sensor at least partially overlap in a region of overlap, the object being disposed in the region of overlap.

6. The automotive detection system of claim 1, wherein each of the absolute misalignment angle of the first radar sensor and the absolute misalignment angle of the second radar sensor is an angle between a prescribed sensor orientation and an actual sensor orientation.

7. The automotive detection system of claim 1, wherein the first and second sensors are located at a front of a vehicle in which the system is installed.

8. The automotive detection system of claim 1, wherein the first and second sensors are located at a rear of a vehicle in which the system is installed.

9. The automotive detection system of claim 1, wherein one of the first and second sensors is located at a front of a vehicle in which the system is installed, and the other of the first and second sensors is located at a rear of the vehicle in which the system is installed.

10. The automotive detection system of claim 1, wherein, if at least one of the absolute misalignment angle of the first radar sensor and the absolute misalignment angle of the second radar sensor exceeds a threshold angle, then an alert is issued.

11. The automotive detection system of claim 10, wherein, in response to the alert, at least one feature of the radar system is disabled.

12. The automotive detection system of claim 11, wherein the disabled feature is at least one of a blind spot detection feature, a rear cross traffic detection feature, a lane change assistance feature, a trailer detection feature, a safe door opening feature, an adaptive cruise control feature, and an autonomous emergency braking feature.

13. The automotive detection system of claim 10, wherein, the alert indicates that at least one of the first and second radar sensors is rotated with respect to a prescribed orientation.

14. The automotive detection system of claim 1, wherein the automotive detection system is a radar system, and the first and second sensors are radar sensors.

15. A method for monitoring alignment of a sensor in an automotive detection system, comprising:
 in a first sensor, transmitting first transmitted signals into a region, receiving first reflected signals generated by reflection of the first transmitted signals, and generating first receive signals indicative of the first reflected signals, a first portion of the first receive signals being generated by reflection of at least a portion of the first transmitted signals from an object in the region;
 in a second sensor, transmitting second transmitted signals into the region, receiving second reflected signals generated by reflection of the second transmitted signals, and generating second receive signals indicative of the second reflected signals, a first portion of the second receive signals being generated by reflection of at least a portion of the second transmitted signals from the same object in the region; and
 in a processor coupled to the first and second sensors, (i) receiving the first portion of the first receive signals and the first portion of the second receive signals, (ii) generating a first velocity vector for the object using the first portion of the first receive signals, (iii) generating a second velocity vector for the object using the first portion of the second receive signals, (iv) using the first and second velocity vectors, generating a relative misalignment angle related to misalignment of the first and second sensors relative to each other, (v) receiving a second portion of the first receive signals, (vi) using the received second portion of the first receive signals, determining an absolute misalignment angle of the first sensor independent of an absolute misalignment angle of the second sensor, and (vii) using the relative misalignment angle and the absolute misalignment angle of the first sensor, generating the absolute misalignment angle of the second sensor; wherein the processor is adapted to process at least one cluster of radar detections associated with the object in each of the first and second receive signals in generating the first and second velocity vectors.

16. The method of claim 15, wherein the first portion of the first receive signals and the first portion of the second receive signals are generated from received first reflected signals and received second reflected signals, respectively, which are reflected from the object while the object is moving with respect to the first and second sensors.

17. The method of claim 15, wherein the second of the first receive signals is generated from received first reflected signals, which are reflected from the object while the object is stationary with respect to the first and second sensors.

18. The method of claim 15, wherein the processor identifies one or more associations between detections related to the object in the first and second receive signals.

19. The method of claim 15, wherein a first field of view of the first sensor and a second field of view of the second sensor at least partially overlap in a region of overlap, the object being disposed in the region of overlap.

20. The method of claim 15, wherein each of the absolute misalignment angle of the first radar sensor and the absolute misalignment angle of the second radar sensor is an angle between a prescribed sensor orientation and an actual sensor orientation.

21. The method of claim 15, wherein the first and second sensors are located at a front of a vehicle in which the system is installed.

22. The method of claim 15, wherein the first and second sensors are located at a rear of a vehicle in which the system is installed.

23. The method of claim 15, wherein one of the first and second sensors is located at a front of a vehicle in which the system is installed, and the other of the first and second sensors is located at a rear of the vehicle in which the system is installed.

24. The method of claim 15, wherein, if at least one of the absolute misalignment angle of the first radar sensor and the absolute misalignment angle of the second radar sensor exceeds a threshold angle, then an alert is issued.

25. The method of claim 24, wherein, in response to the alert, at least one feature of the radar system is disabled.

26. The method of claim 25, wherein the disabled feature is at least one of a blind spot detection feature, a rear cross traffic detection feature, a lane change assistance feature, a trailer detection feature, a safe door opening feature, an adaptive cruise control feature, and/or an autonomous emergency braking feature.

27. The method of claim 24, wherein, the alert indicates that at least one of the first and second radar sensors is rotated with respect to a prescribed orientation.

28. The method of claim 15, wherein the automotive detection system is a radar system, and the first and second sensors are radar sensors.

* * * * *